US010862981B2

(12) United States Patent
Van Erven et al.

(10) Patent No.: US 10,862,981 B2
(45) Date of Patent: *Dec. 8, 2020

(54) SYSTEMS, METHODS, APPARATUS, AND ARTICLES OF MANUFACTURE TO PROVIDE AUTOMATIC WIRELESS CONFIGURATION

(71) Applicant: SONOS, INC., Santa Barbara, CA (US)

(72) Inventors: Niels Van Erven, Santa Barbara, CA (US); Michael Darrell Andrew Ericson, San Diego, CA (US); Steven R. Beckhardt, Boston, MA (US); Nicholas A. J. Millington, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,764

(22) Filed: Jan. 29, 2018

(65) Prior Publication Data

US 2018/0316770 A1    Nov. 1, 2018

Related U.S. Application Data

(63) Continuation of application No. 13/531,712, filed on Jun. 25, 2012, now Pat. No. 9,882,995.

(51) Int. Cl.
*H04L 29/08* (2006.01)
*H04L 12/28* (2006.01)
(Continued)

(52) U.S. Cl.
CPC .......... *H04L 67/18* (2013.01); *H04L 12/2807* (2013.01); *H04L 67/34* (2013.01);
(Continued)

(58) Field of Classification Search
CPC ..... H04L 12/2807; H04L 67/18; H04L 67/34; H04L 2012/2849; H04L 2012/2841;
(Continued)

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

CN    1925688 A    3/2007
CN    102474368 A    5/2012
(Continued)

OTHER PUBLICATIONS

Yamaha DME 64 Owner's Manual; copyright 2004, 80 pages.
(Continued)

*Primary Examiner* — Muhammad Raza

(57) ABSTRACT

Systems, methods, apparatus, and articles of manufacture to provide automated configuration of local playback devices and networks based on external input are disclosed. An example media playback device includes a control interface to receive and process, at the media playback device, network configuration information for a local network from an external source, the control interface to receive and process the network configuration from the external source without requiring user intervention. The example media playback device includes a wireless interface to communicate with the local network based at least in part on the network configuration information. The example media playback device includes a speaker to output audio based on audio information received via the local network.

17 Claims, 11 Drawing Sheets

(51) Int. Cl.

| | |
|---|---|
| *H04N 21/436* | (2011.01) |
| *H04N 21/4363* | (2011.01) |
| *H04N 21/442* | (2011.01) |
| *H04N 21/443* | (2011.01) |
| *H04N 21/6547* | (2011.01) |
| *H04N 21/658* | (2011.01) |
| *H04N 21/81* | (2011.01) |
| *H04W 4/029* | (2018.01) |
| *H04N 21/422* | (2011.01) |
| *H04N 21/43* | (2011.01) |

(52) U.S. Cl.
CPC ..... *H04N 21/422* (2013.01); *H04N 21/43615* (2013.01); *H04N 21/43637* (2013.01); *H04N 21/4432* (2013.01); *H04N 21/44227* (2013.01); *H04N 21/6547* (2013.01); *H04N 21/6582* (2013.01); *H04N 21/8113* (2013.01); *H04W 4/029* (2018.02); *H04L 2012/2841* (2013.01); *H04L 2012/2849* (2013.01); *H04N 21/4307* (2013.01)

(58) Field of Classification Search
CPC ........... H04N 21/422; H04N 21/43615; H04N 21/43637; H04N 21/44227; H04N 21/4432; H04N 21/6547; H04N 21/6582; H04N 21/8113; H04N 21/4307; H04R 2420/07; H04R 2227/005
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,801,529 B1 | 10/2004 | McGrane et al. | |
| 6,865,609 B1* | 3/2005 | Gubbi | H04L 29/06 370/349 |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,505,751 B1* | 3/2009 | Backes | H04W 84/18 455/332 |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,903,653 B2 | 3/2011 | Lee et al. | |
| 7,949,727 B2 | 5/2011 | Jensen | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington et al. | |
| 8,483,853 B1 | 7/2013 | Lambourne | |
| 8,538,564 B2 | 9/2013 | Almstrand et al. | |
| 8,572,224 B2 | 10/2013 | Hite et al. | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0073229 A1 | 6/2002 | Hayashi | |
| 2002/0124097 A1 | 9/2002 | Isely et al. | |
| 2003/0022658 A1* | 1/2003 | Chapman, Jr. | H04W 4/24 455/414.1 |
| 2003/0157951 A1 | 8/2003 | Hasty | |
| 2004/0024478 A1 | 2/2004 | Hans et al. | |
| 2005/0039103 A1* | 2/2005 | Azenko | H03M 13/1515 714/776 |
| 2006/0002681 A1 | 1/2006 | Spilo et al. | |
| 2007/0010248 A1 | 1/2007 | Dravida et al. | |
| 2007/0142944 A1 | 6/2007 | Goldberg et al. | |
| 2008/0242222 A1 | 10/2008 | Bryce et al. | |
| 2009/0081948 A1 | 3/2009 | Banks et al. | |
| 2009/0311984 A1 | 12/2009 | Khushu et al. | |
| 2010/0023978 A1 | 1/2010 | Garg et al. | |
| 2010/0272270 A1* | 10/2010 | Chaikin | H04R 29/008 381/59 |
| 2011/0116413 A1 | 5/2011 | Arai | |
| 2012/0058769 A1 | 3/2012 | Tomita et al. | |
| 2012/0066711 A1 | 3/2012 | Evans et al. | |
| 2012/0102167 A1 | 4/2012 | Sedzin et al. | |
| 2012/0258670 A1* | 10/2012 | Gossain | H04B 17/27 455/67.11 |
| 2013/0324031 A1* | 12/2013 | Loureiro | H04S 7/301 455/3.06 |
| 2014/0200030 A1 | 7/2014 | Barathalwar | |
| 2015/0237578 A1* | 8/2015 | Gogate | H04W 52/0225 370/311 |

FOREIGN PATENT DOCUMENTS

| | | |
|---|---|---|
| EP | 1389853 A1 | 2/2004 |
| EP | 1571861 A2 | 9/2005 |
| EP | 1760611 A1 | 3/2007 |
| EP | 2271008 A1 | 1/2011 |
| EP | 2381737 A1 | 10/2011 |
| JP | 2003330825 | 11/2003 |
| JP | 2004026150 A | 1/2004 |
| JP | 2007051591 A | 3/2007 |
| JP | 2007116672 A | 5/2007 |
| JP | 2007124211 A | 5/2007 |
| JP | 2008263266 A | 10/2008 |
| JP | 2009513069 A | 3/2009 |
| JP | 2011524688 A | 9/2011 |
| JP | 2012028985 A | 2/2012 |
| KR | 20060018859 | 3/2006 |
| KR | 20070040592 | 4/2007 |
| KR | 20090017795 | 2/2009 |
| WO | 200153994 | 7/2001 |
| WO | 2003093950 A2 | 11/2003 |

OTHER PUBLICATIONS

Yamaha DME Designer 3.5 setup manual guide; copyright 2004, 16 pages.
Yamaha DME Designer 3.5 User Manual; Copyright 2004, 507 pages.
Advisory Action dated Oct. 22, 2015, issued in connection with U.S. Appl. No. 13/531,712, filed Jun. 25, 2012, 2 pages.
Advisory Action dated Feb. 27, 2017, issued in connection with U.S. Appl. No. 13/531,712, filed Jun. 25, 2012, 2 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action dated Aug. 14, 2017, issued in connection with Chinese Application No. 201380043270.4, 17 pages.
Chinese Patent Office, Second Office Action dated Apr. 11, 2018, issued in connection with Chinese Application No. 201380043270.4, 8 pages.

(56) References Cited

OTHER PUBLICATIONS

Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Nov. 26, 2015, issued in connection with European Application No. 13808877.8, 9 pages.
European Patent Office, European Partial Search Report dated Jul. 26, 2018, issued in connection with European Application No. 18160311.9, 14 pages.
European Patent Office, European Search Report dated May 31, 2016, issued in connection with European Application No. 13808877.8-1908, 6 pages.
European Patent Office, Summons to Attend Oral Proceedings dated Dec. 7, 2016, issued in connection with European Application No. 13808877.8-1908, 6 pages.
Final Office Action dated Dec. 1, 2016, issued in connection with U.S. Appl. No. 13/531,712, filed Jun. 25, 2012, 39 pages.
International Bureau, International Preliminary Report on Patentability, dated Jan. 8, 2015, issued in connection with International Application No. PCT/US2013/046340, filed on Jun. 18, 2013, 9 pages.
International Searching Authority, International Search Report dated Oct. 18, 2013, issued in connection with International Application No. PCT/US2013/046340, filed on Jun. 18, 2013, 5 pages.
International Searching Authority, Written Opinion dated Oct. 18, 2013, issued in connection with International Application No. PCT/US2013/046340, filed on Jun. 18, 2013, 7 pages.
Japanese Patent Office, Office Action Summary dated Sep. 13, 2016, issued in connection with Japanese Patent Application No. 2015-520283, 4 pages.
Japanese Patent Office, Office Action Summary dated Jan. 19, 2016, issued in connection with Japanese Patent Application No. 2015-520283, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated May 17, 2016, issued in connection with U.S. Appl. No. 13/531,712, filed Jun. 25, 2012, 31 pages.
Notice of Allowance dated Sep. 29, 2017, issued in connection with U.S. Appl. No. 13/531,712, filed Jun. 25, 2012, 18 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
European Patent Office, European Extended Search Report dated Jan. 7, 2019, issued in connection with European Application No. 18160311.9, 11 pages.

* cited by examiner

SYSTEMS, METHODS, APPARATUS, AND ARTICLES OF MANUFACTURE TO PROVIDE AUTOMATIC WIRELESS CONFIGURATION

CROSS-REFERENCE TO RELATED APPLICATIONS

This application claims priority under 35 U.S.C. § 120 to, and is a continuation of, U.S. patent application Ser. No. 13/531,712 filed on Jun. 25, 2012, entitled "Systems, Methods, Apparatus, and Articles of Manufacture to Provide Automatic Wireless Configuration", the contents of which is hereby incorporated by reference in its entirety for all purposes.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
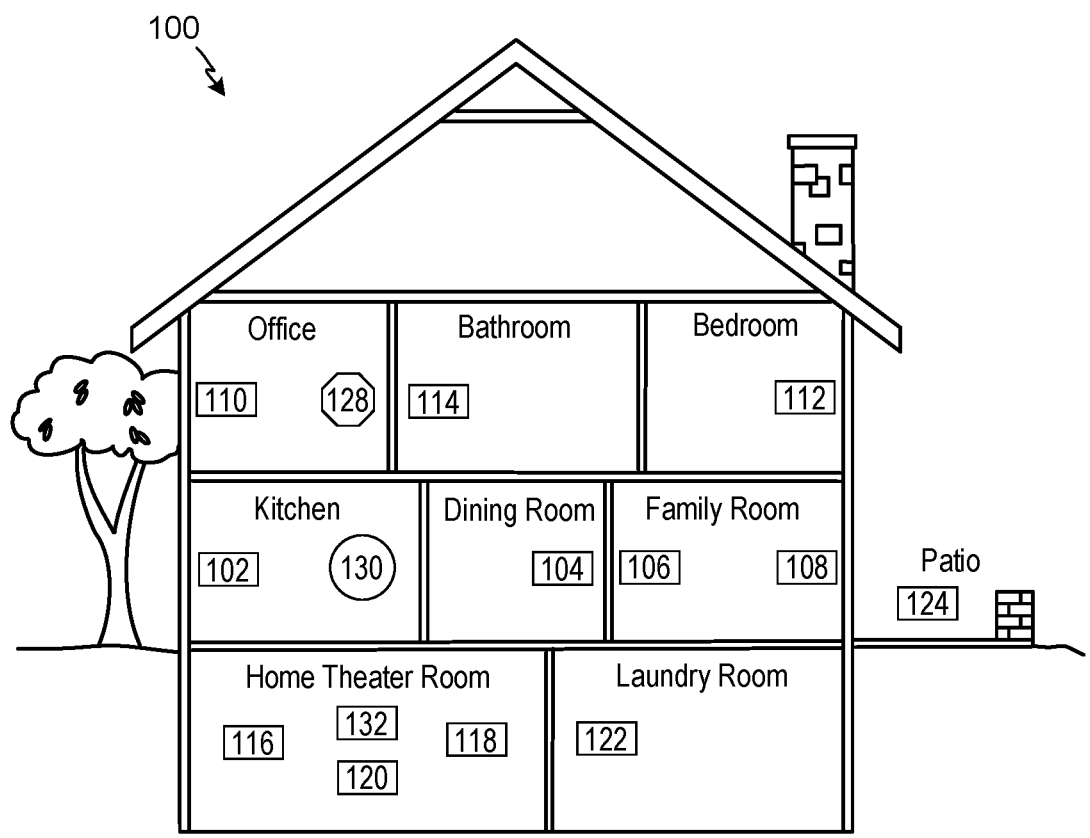
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Media presentation systems include presentation devices, such as displays and/or speakers, to receive content and to generate one or more outputs using the received content. Presentation devices can receive signals representative of the content in a plurality of manners using different techniques and/or technology. In some examples, audio content such as music or the audio portion of audio/video content is encoded onto a carrier signal that is then wirelessly transmitted from one or more sources to one or more wireless playback devices or speakers.

Example systems, methods, apparatus, and articles of manufacture disclosed herein provide for automatic wireless configuration of presentation or playback devices (e.g., via a cloud-based server) to enable delivery and playback of audio. Example systems, methods, apparatus, and articles of manufacture disclosed herein may be advantageously used to provide improved wireless configuration and playback of media content (e.g., audio and/or video) in a network environment.

For purposes of example illustration in the present description, the terms "spectrum" or "wireless spectrum" refer to a range of wireless communications frequencies, where different spectra refer to different ranges of wireless frequencies. Different spectra may or may not overlap. Different spectra may or may not be contiguous (i.e., may or may not have spectra between them). In some examples disclosed herein, the term spectrum refers to a regulatory spectrum as defined by a regulatory agency such as the Federal Communications Commission (FCC) in the United States. For example, the FCC has allocated the "2.4 GHz spectrum" (or spectral band) to include the frequency range of 2400 MHz to 2500 MHz for Industrial, Scientific, and Medical applications. Additionally, the FCC has allocated the "5 GHz spectrum" (or spectral band) to include the frequency range of about 5.17 GHz to about 5.835 GHz, with some excepted bands within that range.

For purposes of example illustration in the present description, the terms "channel," "audio channel," "control channel," and/or, more generally, "wireless channel," refer to a distinct frequency or distinct sub-range(s) of frequencies within one or more spectra that may be used to transmit information. A channel may be a band of frequencies, a non-contiguous set of frequencies and bands, a frequency hopping configuration, time division multiplexing, code division multiplexing, and/or any other type of communication frequency arrangement.

Wireless networking systems operate in the 2.4 GHz and 5 GHz frequency bands of the industrial, scientific and medical (ISM) spectrum reserved for industrial or purposes other than communications, for example, such as short-range, low-power communications and/or computing systems. Wireless systems operate according to one or more standards and/or protocols for communication in one or more frequency bands (e.g., 2.4 GHz, 3.6 GHz, 5 GHz, and so on), for example. IEEE 802.11 is a set of standards to implement wireless local area network communication in the 2.4 and 5 GHz frequency bands, for example. A wireless networking system in such a band has configurable parameters that help define performance of the network and associated system. Such parameters include, for example, wireless channel selection, bit rate (or "bitrate") and encoding used, transmit power, and so on.

For example, the 2.4 GHz frequency band is divided into fourteen (14) channels, each 5 MHz wide, for direct sequence (DS) transmission. A device with a single transceiver can only communicate over one of these channels at a time. If a device has multiple transceivers, then it can communicate over multiple channels simultaneously. A media playback system, such as a Sonos playback system, including multiple playback devices, each with a single transceiver, must use the same wireless channel across the entire system. Furthermore, some of these parameters are restricted by regulatory requirements that differ depending on a geographic region in which the wireless equipment is being operated.

Currently, systems can determine wireless network parameters based on simple heuristics and provide a mechanism for users to manually change the parameters, usually after they struggle with network problems or even after calling Customer Support. With a system view of the network, customer support engineers may be able to manually reconfigure the network parameters to fix problems.

However, it is very hard for a device in a wireless network, such as a mesh network, to determine system parameters by itself and adjust parameters automatically. For example, when selecting a wireless channel in a household several difficulties may present themselves. A best channel in one area of the home may not be the best channel in another area of the home, for example. A best channel at one time of day may not be the best at another time of day, for example. Additionally, it is difficult for a zone player to change its channel to assess another channel while it is currently operating (e.g., playing music). That is, the zone player must be "on channel" to operate properly, but the player also must to switch to another channel to assess that alternate channel, for example.

Some network access points address this specific channel selection problem using one or more Automatic Channel Selection (ACS) algorithms. Automatic Channel Selection algorithms and implementations are used to enable interfaces to determine which channel configuration to use for initiating communication, for a mode of operation that initiates radiation (e.g., access point (AP), mesh, independent basic service set (IBSS) ad hoc network, peer-to-peer (P2P) communication, and so on). However, in this simpler scenario, the network access point makes the judgment itself; there is no mesh of access points across the home that has to switch simultaneously.

In addition to setting wireless network parameters to improve performance, wireless based systems may be subject to different regulatory requirements depending on a geographic region in which they operate. For example, the United States is governed by Federal Communications Commission (FCC) regulations and has different regulatory requirements than European countries that follow European Telecommunications Standards Institute (ETSI) standards; similarly, Japan and China each have their own regulatory requirements, for example.

Regulatory requirements also affect wireless network parameters. For example, with the 2.4 GHz and 5 GHz frequency bands used in 802.11 a/b/g/n, there are region-specific requirements on channels (e.g., frequencies) that may be used, signal output power that is used, and time a channel can be occupied. The regulatory requirements are governed by local laws for which the products are used. However, most products rely on manually setting these parameters (1) at a factory or regional distribution center prior to shipping into a region or to a customer; (2) at a customer location by asking the customer to select an operating region or inferring the operating region by asking a series of questions; or (3) using a least common denominator among all regions to set the parameters. These methods can be cumbersome or unnecessarily limiting in performance, or even open to customer abuse. For example, systems that have their region settings selected at the factory cannot be easily be redistributed to different regions without reconfiguring the settings, which often requires opening up the product packaging, powering up the system, logging into the system with certain administrator-level access, and changing the region settings. Furthermore, if a unit is sold in a specific country/region, and later moved to a different country/region by the customer, the customer may end up operating the product in violation of local laws; this may happen unintentionally if the user is unfamiliar with the local laws governing wireless transmission. Note that some countries do not allow the customer to select the region settings for fear the customer may 'game the system' by selecting an alternate region that is more permissible than the current region.

Certain embodiments help overcome some or all of the above challenges by automatically configuring wireless network parameters using, for example, a cloud-based server. Certain embodiments facilitate automated location determination and/or network performance data gathering without requiring user intervention. Certain embodiments facilitate interaction with an external source to identify a location of a media playback device and/or determine appropriate parameters for device and/or local wireless network configuration, etc.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
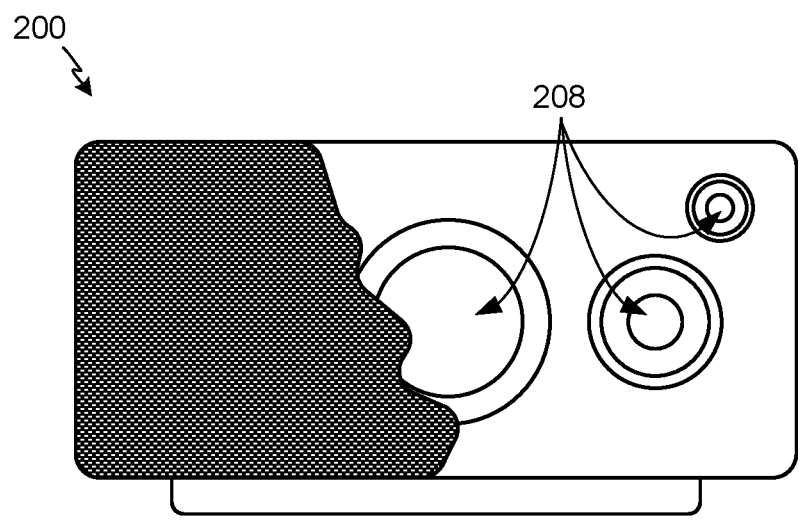
FIG. 2A shows an illustration of an example zone player having a built-in amplifier and speakers.
Figure 2B:
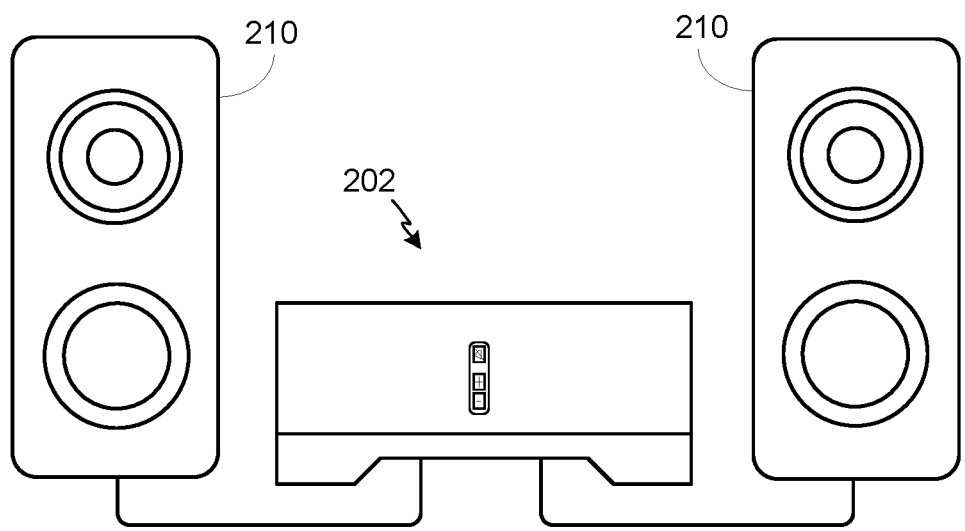
FIG. 2B shows an illustration of an example zone player having a built-in amplifier and connected to external speakers.
Figure 2C:
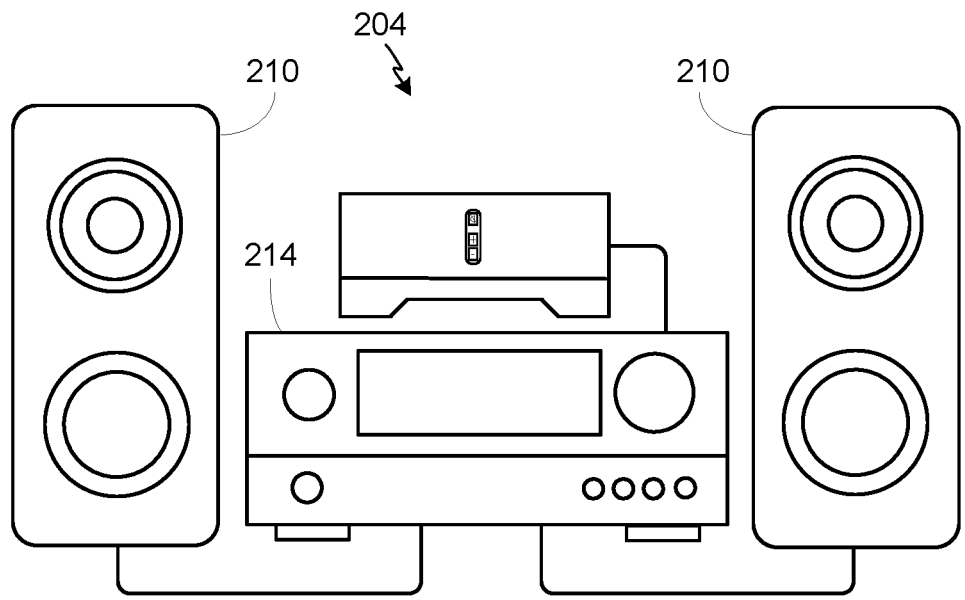
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
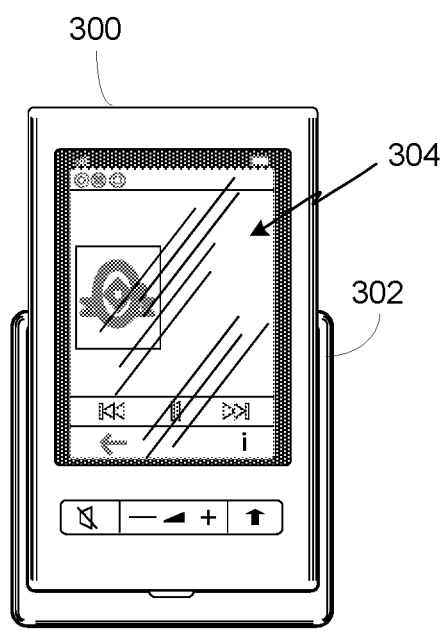
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™ IPAD™ ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "SONOS® Control," "SONOS® Controller for IPHONE™," "SONOS® Controller for IPAD™," "SONOS®" Controller for ANDROID™, "SONOS® Controller for MAC or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
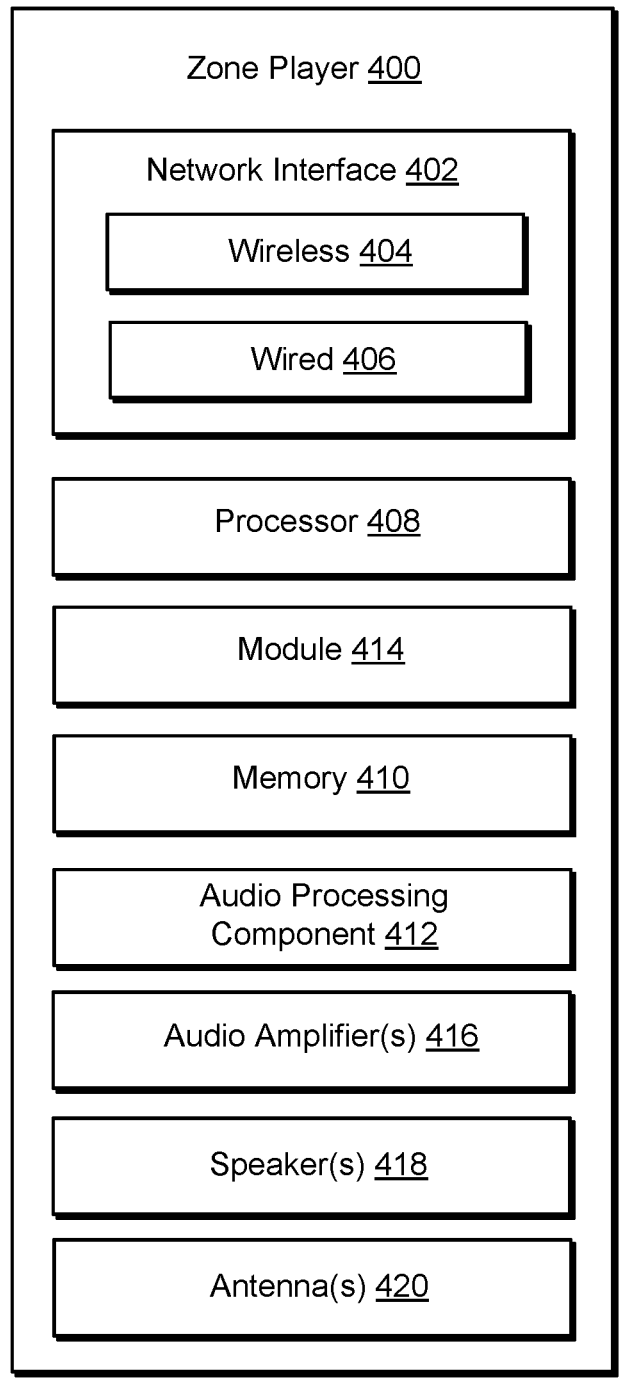
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5.

IV. Controller

Figure 5:
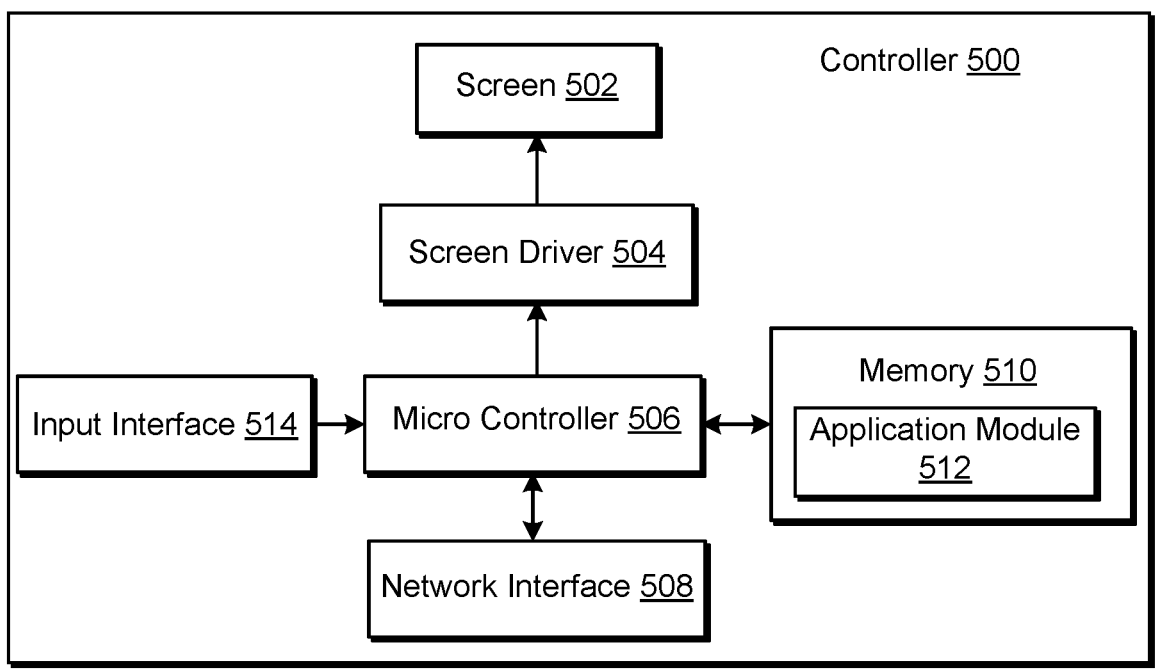
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standard including IEEE 802.11a, 802.11b 802.11g, 802.11n, or 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user must manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Configuration Systems and Methods

Certain embodiments facilitate automatic configuration of a media playback device (e.g., a zone player 400) with configuration parameters for a local wireless playback network. Automated network parameter configuration may be facilitated using a cloud-based server and/or other network server, for example.

Figure 6:
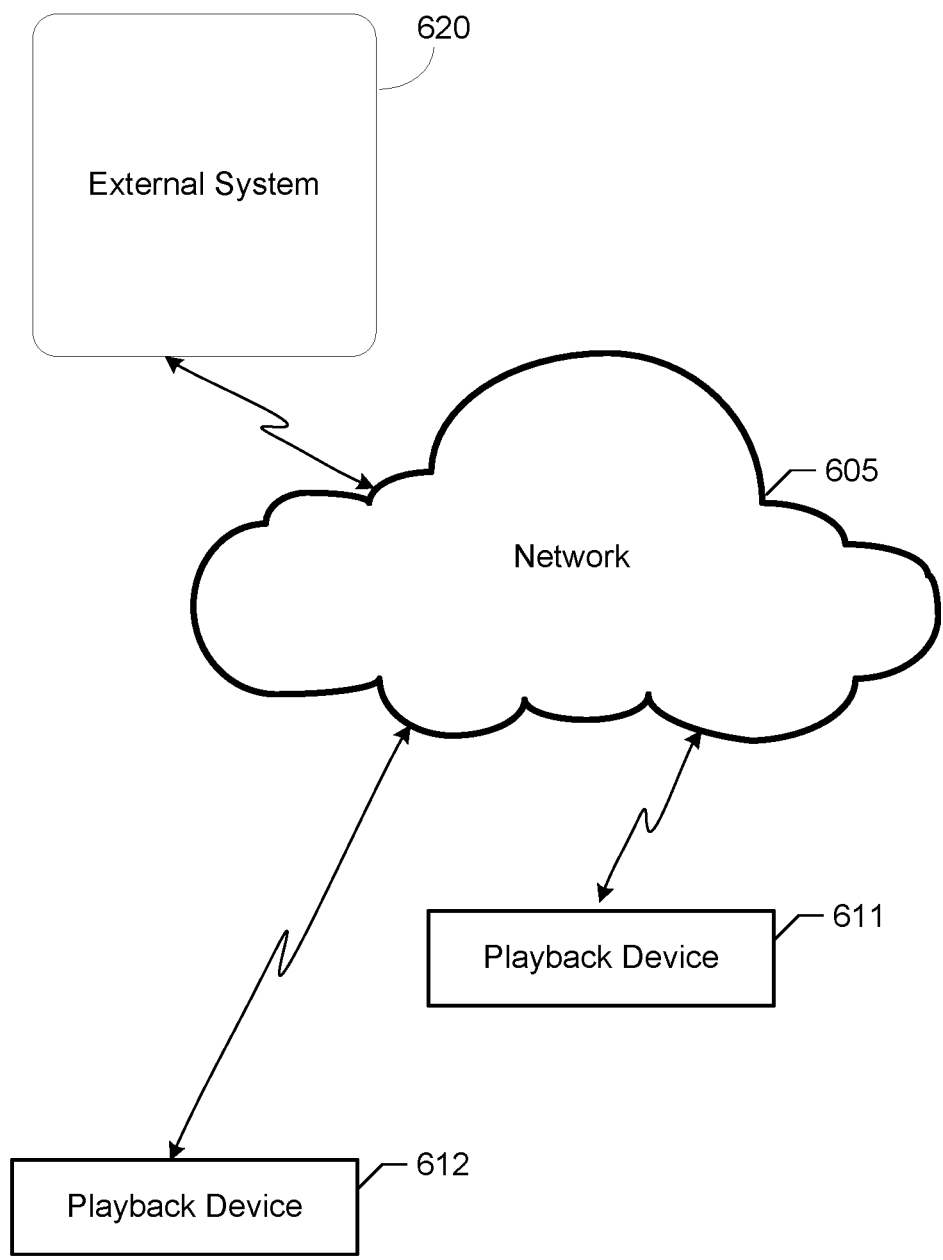
FIG. 6 depicts an example playback network including one or more playback devices communicating with an external system to retrieve and/or receive one or more configuration parameters.

FIG. 6 depicts an example playback network 605 including one or more playback devices (e.g., zone players 400) 611-612 communicating with an external system 620 to retrieve and/or receive (e.g., via push and/or pull) one or more configuration parameters related to network connection, operation, grouping (e.g., zone group configuration), content playback, and so on. The external system 620 may be and/or include a cloud-based server or other network-connected server device, for example. The external server 620 may interact with the local devices 611, 612 to provide regional (e.g., geographic) configuration information, communication channel selection, and so on. The external server 620 and local playback devices 611, 612 may exchange parameter information without user intervention, for example. The playback devices 611, 612 can then use the information to configure network parameters for operation on the network 605, for example.

In one example, automated configuration of wireless network parameters can be facilitated for the local devices 611, 612 based on regional location without user intervention. Regional location is determined, for example, using input such as a global positioning device, cloud server, or another device on the local network. Wireless network parameter(s) can be provided by the cloud server (e.g., external system 620) or another device on the local network, for example, based on location information. Wireless parameter(s) can also be stored locally on the device for each region, and the proper settings applied once the region is determined, for example.

In the example of FIG. 6, the wireless network includes a plurality of different networking devices such as multimedia devices (e.g., zone player, wireless enabled television, etc.), wireless handheld devices (e.g., IPOD™ IPHONE™ IPAD™ etc.), access points, and network bridges. The wireless network may be a mesh network, access point network, etc.

In the example of FIG. 6, automatic configuration of wireless network parameters is facilitated in a mesh network using a cloud server without user intervention. The wireless network can include multiple different networking devices such as multimedia devices (e.g., zone player, wireless enabled television, etc.), wireless handheld devices (e.g., IPOD™ IPHONE™ IPAD™) access points, and network bridges. Network data is collected by playback devices 611, 612 and periodically sent to a cloud server for analysis. Wireless network parameters that can be configured via the cloud server include wireless channel, bit-rate, transmit power, and so on. A wireless topology may also be reconfigured via the cloud server, for example.

In certain embodiments, for networks using a Spanning Tree protocol, a root of the Spanning Tree may be re-assigned by the cloud server.

Certain embodiments facilitate configuration of wireless network parameters using a cloud server but with remote, manual intervention.

Figure 7:
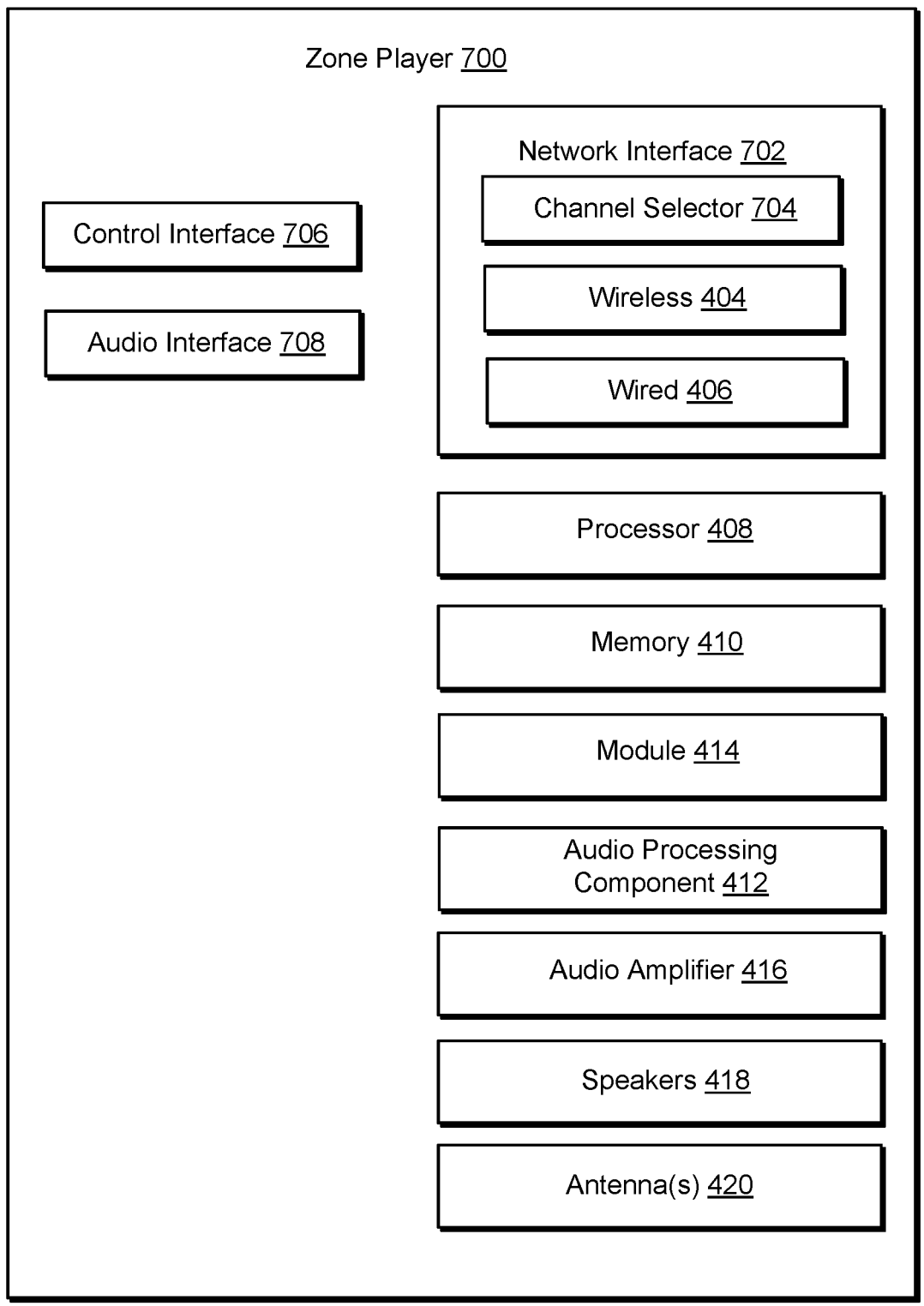
FIG. 7 shows an internal functional block diagram of an example zone player to receive location-based wireless parameter information from an external source.

FIG. 7 shows an internal functional block diagram of an example zone player 700 to receive location-based wireless parameter information from an external source. The example zone player 700 of FIG. 7 may be used to implement any of the example zone players 102-124 of FIG. 1, for example. In some embodiments, the example zone player 700 may be used to implement one of the home theater zone players 116, 118, 120 and may include a sound bar. As used herein, a "sound bar" refers to a single playback device including an array of speakers configured to replicate audio for video and to replicate audio in general. In some instances, a sound bar may simulate or partially simulate a surround sound experience.

Like the example zone player 400 of FIG. 4, the example zone player 700 of FIG. 7 includes a processor 408, memory 410, an audio processing component 412, a module 414, an audio amplifier 416, speakers 418, and one or more antenna(s) 420. These components are discussed in more detail above. More or less components may be included depending on the desired configuration. The example zone player 700 of FIG. 7 includes a network interface 702 having a wireless interface 404 to communicate via a designated wireless spectrum (e.g., 2.4 GHz spectrum, 5 GHz spectrum, etc.) and a wired interface 406. The wireless interface 404 and wired interface 406 are discussed in further detail above.

The example zone player 700 may simultaneously or substantially simultaneously communicate via any or all of the interfaces 404, 406.

The network interface 702 also includes a channel selector 704 to receive a wireless channel selection (e.g., one of 14 channels in the 2.4 GHz frequency band). The channel selection can be received via the wireless interface 404 and/or wired interface 406, for example. The channel selector 704 may be configured with a default channel selection (e.g., a factory-set default), for example, which may be changed according to a received and/or otherwise determined channel selection. A channel setting may be based on location (e.g., region, household, etc.), for example. As disclosed further below, the channel setting is used for communication via the wireless interface 404, for example.

Each of the example interfaces 404, 406 of FIG. 7 may have a unique identifier such as a unique Media Access Control (MAC) address. Thus, each of the example interfaces 404, 406 may be addressed separately, and the example zone player 700 may communicate using any or all of the interfaces 404, 406 simultaneously if so desired.

The example zone player 700 of FIG. 7 further includes a control interface 706 and an audio interface 708. The control interface 706 transmits and/or receives control information (e.g., configuration information) via one or both of the interfaces 404, 406. For example, the control interface 706 may communicate configuration information to one or more other zone players and/or communicate configuration information to one or more other zone players via interface(s) 404, 406. In some examples, the control interface 706 receives configuration information (e.g., wireless channel selection, bit rate, encoding, transmit power, location, etc.) via the interface(s), 404, 406 from other zone players. The example control interface 706 additionally or alternatively communicates control information (e.g., channel probes, location queries, bit rate information, encoding information, etc.) to another zone player, a network (e.g., cloud-based) server, etc., via the interface(s) 404, 406, for example.

The example audio interface 708 of FIG. 7 transmits audio information and/or receives audio information via the interfaces 404, 406. For example, the audio interface 708 may receive digital audio information from an Internet source, from a local networked source (e.g., a computer via a local area network or LAN), and/or from another home theater component such as a television, a cable box, an optical media player (DVD, Blu-ray disc, etc.), a digital media player, a video game console, and/or any other type of audio source. The example audio interface 708 further transmits received audio information to one or more zone players, including standard zone players (e.g., via line-out connection such as RCA or optical output, or via a mesh network via interface 404 and/or interface 406. In some examples, the audio interface 708 transmits the audio information based on control information provided by the control interface 706.

To control which channel(s) are used, the example network interface 702 includes channel selector 704. The example channel selector 704 selects channel(s) in a spectrum (e.g., 2.4 GHz, 5 GHz, etc.). The example wireless interface 404 transmits and/or receives information via the selected channel. In some examples, the channel is selected by a different device (e.g., an external device such as another zone player, cloud-based server, etc.), and the channel selector 704 is provided with the channel information via interface 404, 406.

In some examples, the currently selected channel may become unsuitable for media content (e.g., audio) playback, and another, more suitable channel is available. The example channel selector 704 may select a new channel and provide the channel information to the control interface 706, for example. The example channel selector 704 then causes the wireless interface 404 to change to the new selected channel. The audio interface 708 may then continue to transmit audio information on the new selected channel. In some examples, the new channel information may be passed along to another connected zone player, reported back to a cloud-based server, etc.

In an example of operation, the control interface 706 initially (e.g., on start up, on adding a zone player to a zone player network, etc.) communicates with an external device (e.g., a connected zone player, a cloud-based server, etc.) via interface 404, 406. The control interface 706 transmits control information and/or requests an update of control information via a default or last-known channel and/or other wireless setting, for example. The example control information includes at least a selected channel and an identifier of the zone player 700 (e.g., to differentiate the zone player 700 from any other zone players that may be on the same network), for example. After transmitting the control information (and, in some embodiments, receiving acknowledgement from the external device), the example control interface 706 may receive feedback, such as updated control information, via interface 404, 406. If appropriate, the control interface 706 facilitates an update or other change of zone player 700 parameters, such as via channel selector 704, based on the updated information received from the external device.

Continuing with the example, if the selected channel becomes inadequate (e.g., too much interference, too much latency, the zone player is moved, etc.), the example control interface 706 may request updated information from an available external device (e.g., another connected zone player, cloud-based server, etc.). In certain embodiments, the channel selector 704 selects a different channel and transmits control information to other zone players on the same local network identifying the newly selected channel.

Figure 8:
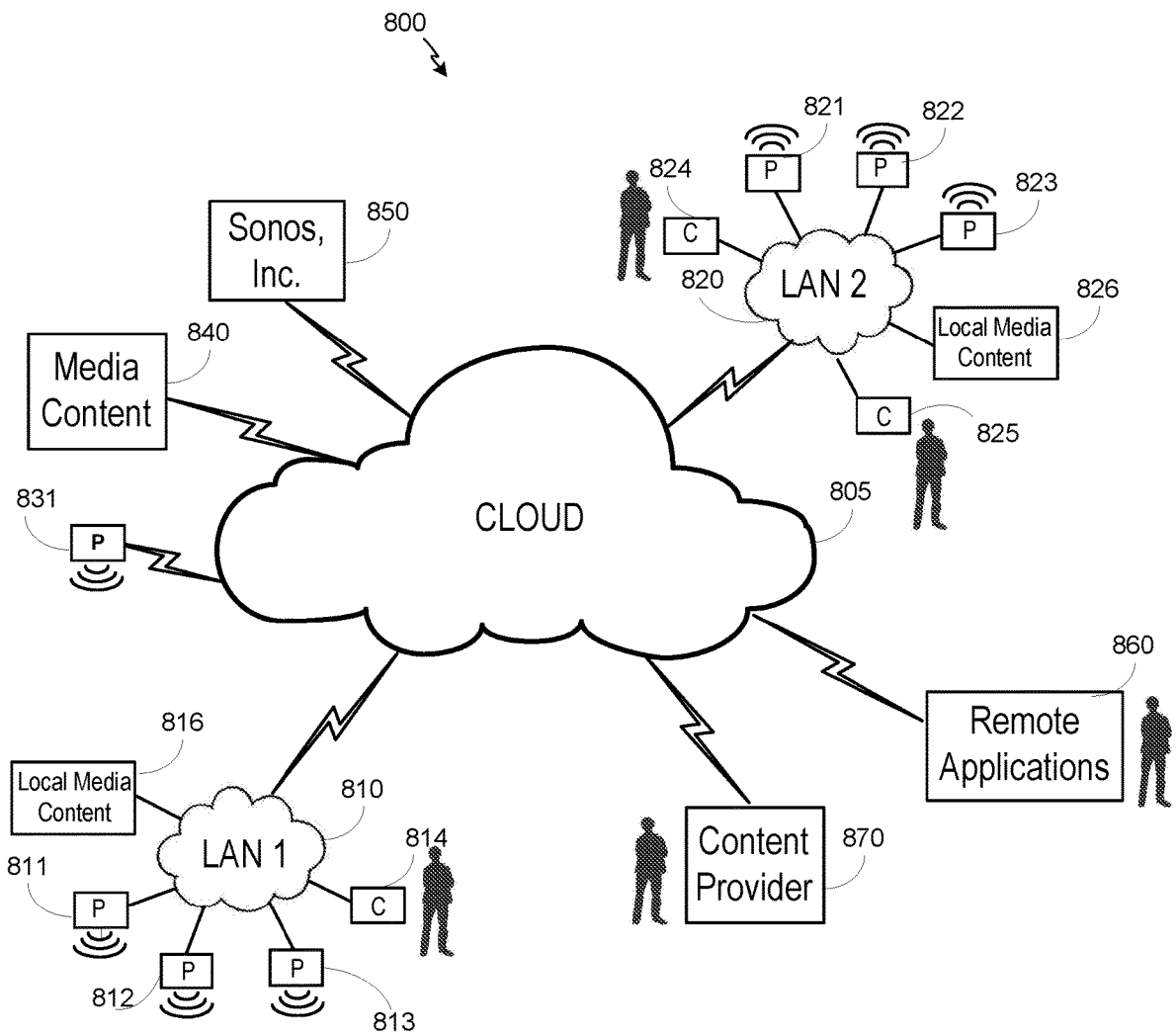
FIG. 8 illustrates an example system including a plurality of networks including a cloud-based network and one or more local playback networks.

FIG. 8 illustrates an example system 800 including a plurality of networks including a cloud-based network and one or more local playback networks. The system 800 includes a cloud or other network 805 connecting a plurality of local networks (e.g., LANs) and/or external systems for communication and data exchange, for example. The example system 800 includes local networks 810, 820. Each local network 810 820 includes a plurality of media playback devices 811-813, 821-823, as well as a controller 814, 824-825, for example. Local media content 816, 826 is stored and provided for playback via the local area network 810, 820, for example.

The example system 800 of FIG. 8 also includes additional playback device(s) 831, not associated with a local network. The example system 800 further includes one or more external systems including media content 840, a remote cloud server 850, remote application(s) 860, a content provider 870, and so on.

One or more playback devices 811-813, 821-823, 831 and/or controllers 814, 824-825 can retrieve network and/or other configuration information (e.g., wireless mesh network configuration parameters) via the cloud 805, for example. For example, a cloud server 850, other network device, global positioning device, etc., can provide location-based configuration information (e.g., communication channel, geographic region, etc.) to a networked device. Additionally, media content (e.g., audio, video, etc.) can be shared among the system 800, for example. Automated determination and configuration is described in further detail below.

In certain embodiments, a wireless network (e.g., network 805, 810, 820) can include a plurality of networking devices such as media playback devices (e.g., a zone player, wireless speaker, wireless-enabled television, and so on), wireless handheld devices (e.g., a mobile music player such as an IPOD™, a smartphone such as an IPHONE™, a tablet computer such as an IPAD™ and so on), access points, bridges, etc. In certain embodiments, the wireless network may be a mesh network, an access point network, etc.

1. Example Region Configuration

Certain embodiments automatically determine location and configure region parameters for a playback device in a playback system while the device is in use. In these embodiments, neither human intervention by a user nor region-specific configuration setting done at a factory distributor is required.

A location of a device (for example, a PLAY:5 or PLAY:3) can be determined by a sensor, such as a Global Positioning System (GPS) embedded in the playback device. If the device has such functionality, then the region setting can be set automatically when the device boots up and determines its location, for example. For example, the playback device may connect to a GPS satellite and/or nearby ground relay (e.g., cellular tower) to determine its location.

Alternatively, if the device does not have global positioning functionality but is connected to a network, such as the Internet, the location may be determined remotely by a cloud-based service that can determine in which geographic location (e.g., country) the unit is being operated based on its IP address, for example. For example, a playback device may communicate with a computer on which a user is running playback controller software to obtain location-based setting information.

In certain embodiments, if the playback device is being added to an existing network, then the device may inherit region setting(s) from other products already using that network. For example, a playback device interacting with a bridge or other playback device to gain access to a local playback network can receive region setting information in addition to other network configuration when joining the network (and/or shortly thereafter).

Once the location is determined, in some embodiments, the region settings can be automatically configured on the device. That is, no manual user interaction is needed for the device to be configured based on its current geographic region, for example. In some embodiments, the settings for all regions (or the most common regions or some other subset of regions, for example) can be stored locally on the device in non-volatile memory or on another similar device or local server connected to the wireless network.

In some embodiments, the device can retrieve settings from a cloud-based service based on the region, for example. The cloud-based service can help ensure that devices within a household have the same region settings, and, if necessary or desired, these settings can be updated over time as regulatory laws, preferences, etc., change.

Figure 9:
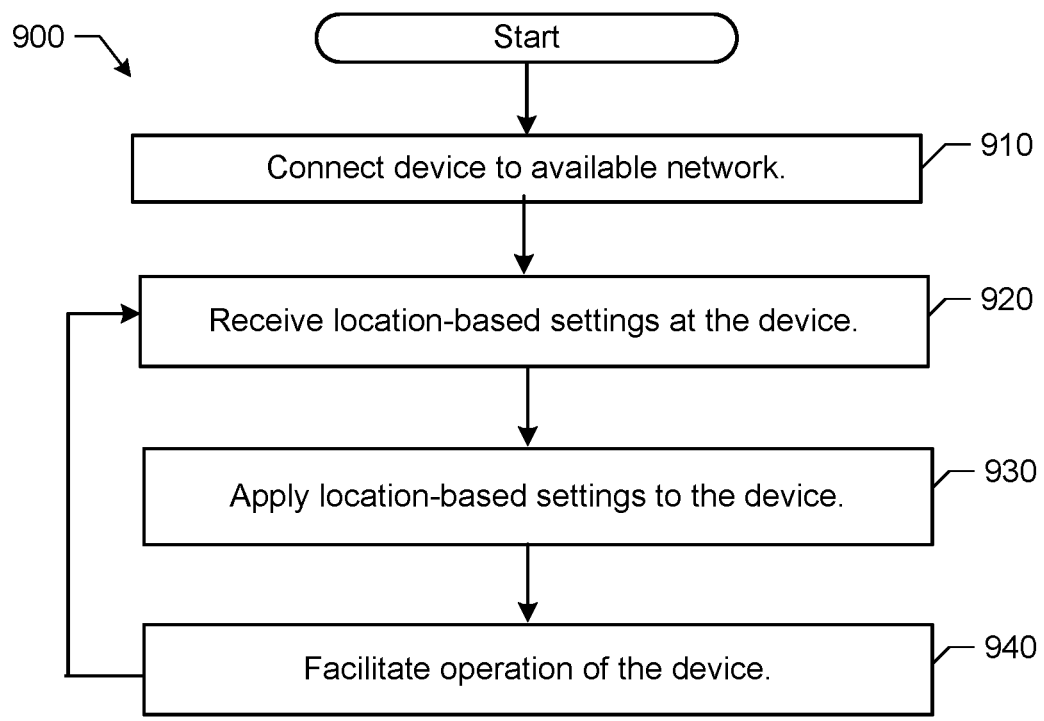
FIG. 9 shows a flow diagram of an example method to determine a location of a device and establish location-based setting(s) for the device.

FIG. 9 shows a flow diagram of an example method 900 to determine a location of a device and establish location-based setting(s) for the device. At block 910, a device connects to an available network. For example, a zone player connects to a household wireless network. The device may connect to the network using default setting(s), which are to be updated once the device has established a secure connection with other devices on the network.

At block 920, the device receives location-based settings. For example, the playback device receives a geographic region in which the network is located which in turn triggers an adjustment in how the device is connected to the network, facilitates content playback, etc. At block 930, the received/retrieved settings are applied to the device. For example, the device may be configured from the default settings applied at power-up based on the regional settings received. The device may be reconfigured based on a change of region since the last configuration, for example. At block 940, device operation is facilitated according to the updated settings. For example, the device may communicate with a content provider, other playback device, controller, etc., to receive content and/or playlist information for playback, etc.

Figure 10:
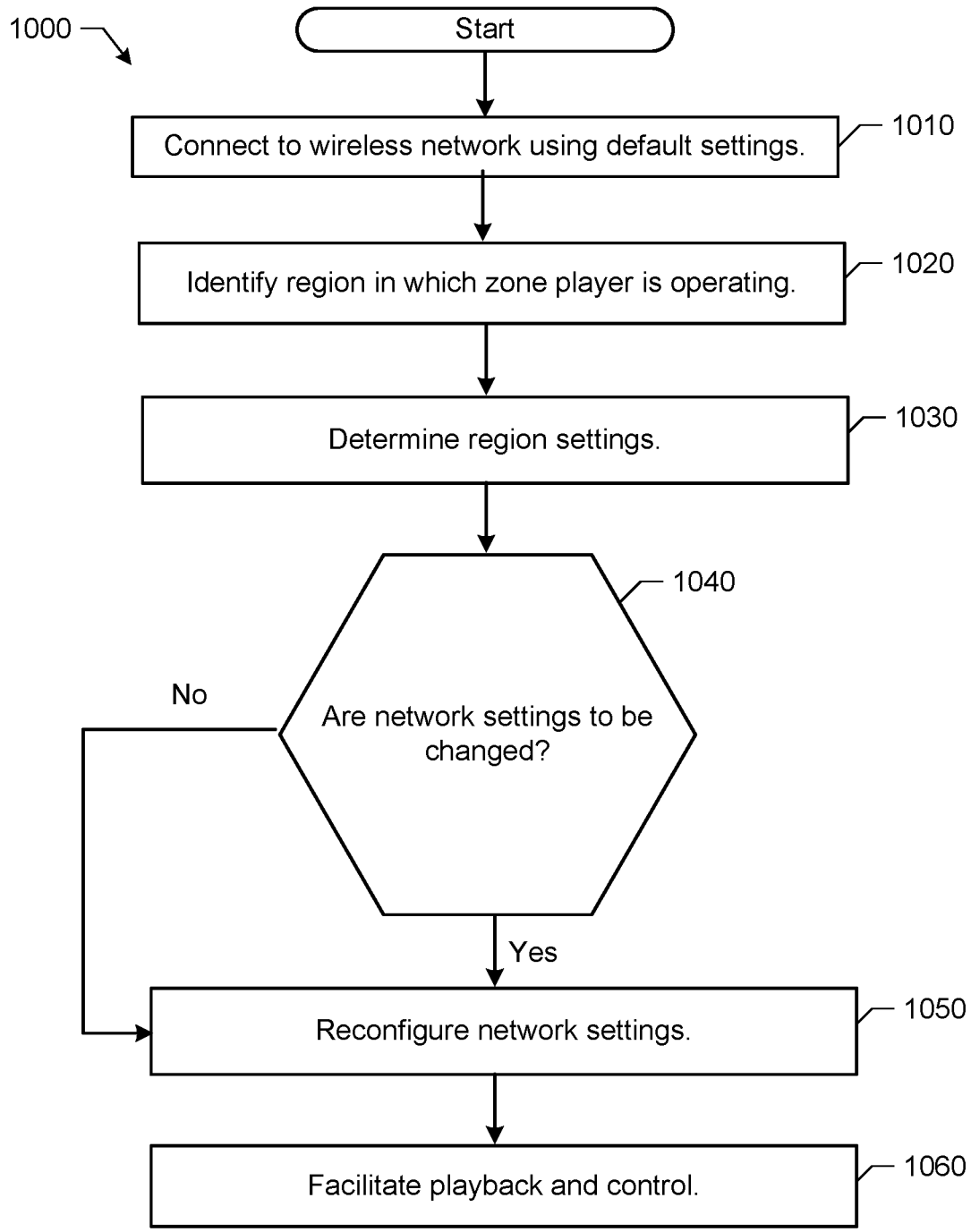
FIG. 10 illustrates a flow diagram of a more specific example method to determine region settings and reconfigure a device appropriately.

FIG. 10 illustrates a flow diagram of a more specific example method 1000 to determine region settings and reconfigure a zone player appropriately. At block 1010, the zone player connects to an available wireless network using default settings (e.g., factory defaults). For example, the zone player may exchange connection information (e.g., a security parameter) with a device already on the network to connect to the network.

At block 1020, the zone player identifies a geographic region in which it is operating. For example, using GPS, information from another device on the network, an Internet connection, etc., the zone player identifies a geographic region in which it is currently located. At block 1030, settings for the identified region are determined. For example, region parameters may include radio spectrum, wireless channel, bit rate, encoding, transmit power, security mechanisms, and so on.

At block 1040, the region settings are compared to the default settings of the zone player to determine whether the network settings of the zone player are to be changed. If yes, then, at block 1050, network settings for the zone player are reconfigured based on the determined region settings. At block 1060, playback and control of content on the network is facilitated via the zone player.

2. Example Channel Selection

In certain embodiments, challenges of channel selection in a mesh network can be overcome by collecting data on a current operating channel, other possible wireless channels, music dropout rate, packet error rate, and so on, and uploading this data to a cloud-based and/or other networked server periodically and/or based on a trigger, for example. In certain embodiments, data can be pushed or pulled. The cloud-based server runs various algorithms or heuristics and can direct a zone player in a household to initiate a channel change for the household. Thus, in certain embodiments, processing on the zone player is limited to data collection, data uploading, and performing the channel change, for example. Other processing and analysis is performed on the cloud/network server. In certain embodiments, in addition to and/or instead of channel selection, algorithm(s)/heuristic(s) can be evaluated to adjust a variety of parameters such as bit rate, transmit power, network topology, etc.

Using a cloud-based server provides increased processing power and memory over an individual playback device to execute algorithms and/or evaluate heuristics to determine channel selection, etc. Algorithms and heuristics can be on the cloud server without rolling out new firmware on the zone players, for example. Testing can be limited to a few households to assess algorithms, for example. An algorithm can be rolled out gradually to a limited number of households at a time, for example.

Certain embodiments provide access to raw data for examination (as opposed to the data being only in a zone player's memory). Using the cloud server, sufficient storage can be provided to maintain a history of channel usage per household (if desired) so that a user can assess previous decisions over a long period of time to help judge effectiveness, for example.

Alternatively, customer support can remotely configure a network parameter such as channel selection. As such, similar processing may occur as described above, but instead of automatically configuring the network system, the process allows for a customer support individual to manually configure the device via a remote location, for example.

In certain embodiments, wireless network parameters can be automatically configured in a mesh network using a cloud server without user intervention. For example, network data is collected by playback devices (e.g., zone players) and periodically sent to a cloud server for analysis. Wireless network parameters that may be configured via the cloud server include wireless channel, bit rate, transmit power, etc. In certain embodiments, a wireless network topology may be reconfigured via the cloud server.

In certain embodiments, network configuration can include a spanning tree protocol. A spanning tree protocol refers to a network protocol that structures a network to avoid bridge loops by, in general, 1) designating a root node, 2) calculating the least cost path from other nodes to the root node, and 3) disabling other paths. A playback device such as zone player 400, 700 may advantageously use a spanning tree protocol to communicate with satellite zone players and/or other zone players in a mesh network. The use of spanning tree protocol enables the delivery of low-latency audio by determining shortest paths between points and by reducing (e.g., avoiding) unnecessary hops of the low-latency audio data between zone players. An example spanning tree protocol configuration may be a spanning tree protocol table (e.g., stored in the memory 410) that includes the ports and/or devices to which the example zone player 400, 700 is connected. The example spanning tree protocol table can be reconfigured when additional zone players are added, zone player location is changed, and/or when configurations of zone players are changed, for example. For networks using the spanning tree protocol, a root of the spanning tree may be re-assigned by the cloud server.

Figure 11:
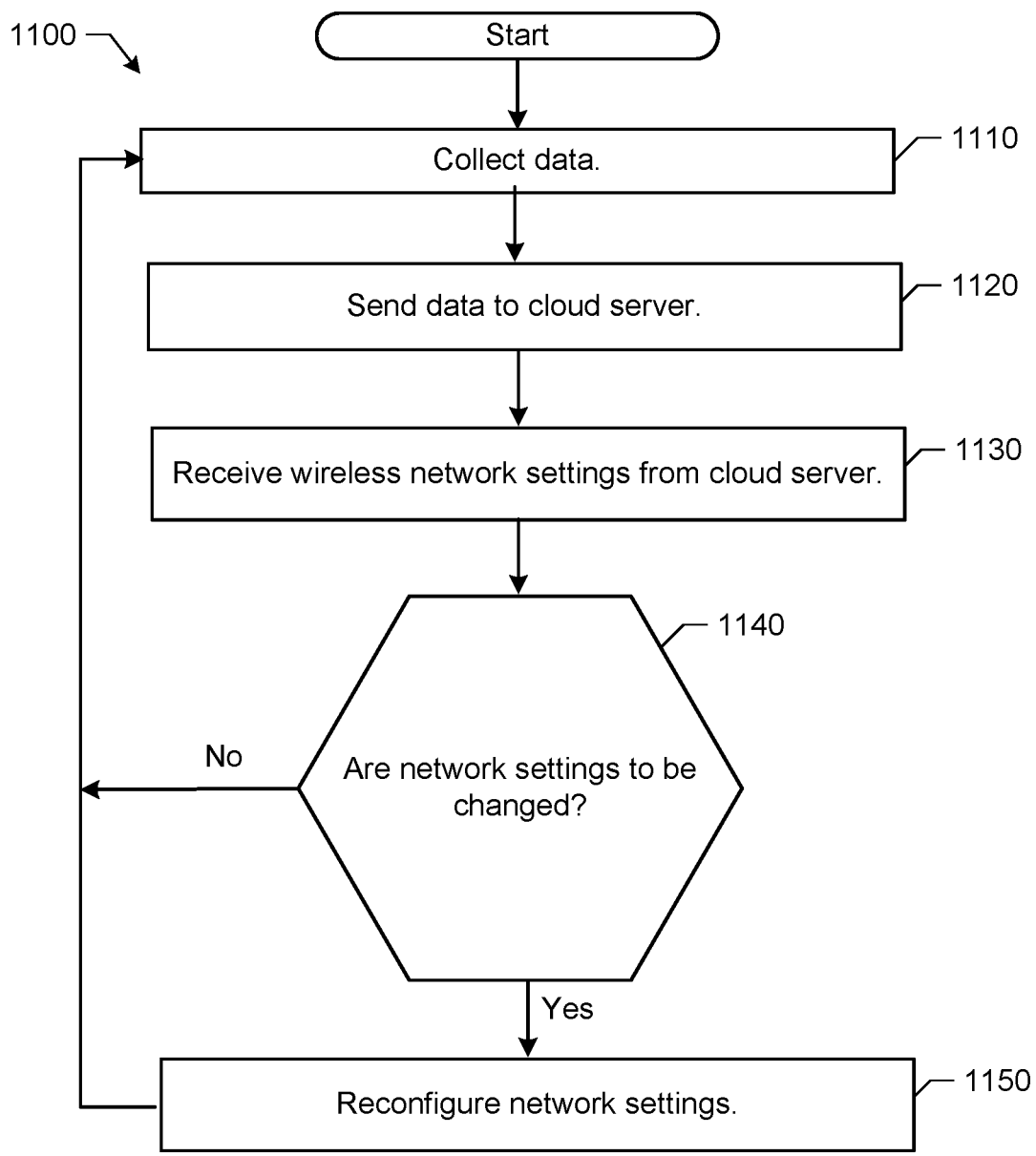
FIG. 11 shows a flow diagram of an example method to collect data to send to a cloud server to determine wireless network settings.

FIG. 11 shows a flow diagram of an example method 1100 to collect data to send to a cloud server to determine wireless network settings. At block 1110, data is collected. For example, one or more zone players on a network can collect network data (e.g., network configuration parameters, network activity, network conditions, etc.).

At block 1120, the collected data is sent to a cloud server. For example, a zone player can periodically and/or on demand (e.g., based on a request, a trigger, a detected change in network data, etc.) transmit the collected data to the cloud server. For example, in response to the collected data from the zone player, the cloud server analyzes the data according to one or more rules, thresholds, algorithms, heuristics, preferences, etc. Based on the analysis, the cloud server selects or otherwise determines wireless network settings for the zone player.

At block 1130, wireless network settings are received from the cloud server. For example, the cloud server can transmit the selected wireless network settings to one or more zone players on a requesting local network. At block 1140, a determination is made regarding whether network settings are to be changed. For example, the zone player may determine whether the received settings differ from existing settings on the zone player. If yes, then, at block 1150, network settings are reconfigured. The process can then repeat by collected data at block 1110, for example.

VI. Conclusion

As discussed above, systems and methods are provided to offer wireless playback content via a local wireless network while adapting to regional and/or other network constraints. Certain embodiments provide automated location determination in conjunction with configuration of a media playback device for playback via a local wireless network based at least in part on regional configuration information (e.g., wireless channel, bit rate, transmit power, encoding, etc.). Certain embodiments provide automated collection of network information by a media playback device for transmission to an external source (e.g., another playback device, cloud-based server, etc.) which in turn provides network configuration information back to the media playback device.

In certain embodiments, a method includes automatically determining, without user intervention, a geographic region location of a playback device connected to a network. The example method includes configuring, at the playback device, network parameters for wireless connection and communication by the playback device to the network based on configuration information associated with the determined geographic region. The example method includes enabling communication by the playback device via the network.

In certain embodiments, a method includes collecting, by a playback device, data relating to wireless performance of a local wireless network to which the playback device is connected. The example method includes transmitting, by the playback device without user intervention, a first message to a network server, the first message including the data relating to wireless performance of the local wireless network. The example method includes receiving, at the playback device, a second message from the network server including wireless network parameters for the playback device on the local wireless network. The example method includes initiating, by the playback device, reconfiguration of the local wireless network based on the received wireless network parameters.

In certain embodiments, a media playback device includes a control interface to receive and process, at the media playback device, network configuration information for a local network from an external source. The example control interface is to receive and process the network configuration from the external source without requiring user intervention. The example media playback device includes a wireless interface to communicate with the local network based at least in part on the network configuration information. The example media playback device includes a speaker to output audio based on audio information received via the local network.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method implemented by a first playback device, the method comprising:
    connecting to a wireless mesh network on which a plurality of playback devices operate, wherein the wireless mesh network is configured according to a spanning tree associated with a spanning tree protocol, and wherein the first playback device comprises network settings to be employed by the first playback device for communication over the wireless mesh network;
    after connecting to the wireless mesh network, determining a geographic region in which the first playback device is located from a plurality of geographic regions, wherein determining the geographic region in which the first playback device is located comprises determining a country in which the first playback device is located, wherein each of the plurality of geographic regions has respective regulatory requirements for wireless communication, and wherein at least some of the plurality of geographic regions have respective regulatory requirements for wireless communication that are different;
    receiving, from a cloud-based server via the wireless mesh network, an instruction to update network parameters based on the determined geographic region and the respective regulatory requirements for the determined geographic region, the instruction comprising (i) an instruction from the cloud-based server to set a channel for operation on the wireless mesh network, (ii) an instruction from the cloud-based server to set a transmit power for operation on the wireless mesh network, and (iii) an instruction from the cloud-based server to set a bit rate for operation on the wireless mesh network;

based on the instruction to update network parameters received from the cloud-based server, updating the network settings to be employed by the first playback device for communication over the wireless mesh network; and after updating the network settings to be employed by the first playback device for communication over the wireless mesh network, (i) receiving, based on the updated network settings, audio content over the wireless mesh network via the spanning tree protocol and (ii) playing audio associated with the received audio content in synchrony with a second playback device of the plurality of playback devices.

2. The method of claim 1, wherein the instruction from the cloud-based server to set the channel for operation on the wireless mesh network comprises an instruction from the cloud-based server to initiate the channel change on the wireless mesh network.

3. The method of claim 1, wherein the instruction from the cloud-based server to set the transmit power for operation on the wireless mesh network comprises an instruction from the cloud-based server to adjust the transmit power on the wireless mesh network.

4. The method of claim 1, wherein the instruction from the cloud-based server to set the bit rate for operation on the wireless mesh network comprises an instruction from the cloud-based server to adjust the bit rate on the wireless mesh network.

5. The method of claim 1, wherein the geographic region in which the first playback device is located is determined based on a global positioning device.

6. The method of claim 1, wherein the determining the geographic region in which the first playback device is located is triggered by the connection to the wireless mesh network by the first playback device.

7. A first playback device, comprising:
at least one processor; and
a non-transitory computer-readable medium; and
program instructions stored on the non-transitory computer-readable medium that are executable by the at least one processor and thereby cause the first playback device to be configured to:
connect to a wireless mesh network on which a plurality of playback devices operate, wherein the wireless mesh network is configured according to a spanning tree associated with a spanning tree protocol, and wherein the first playback device comprises network settings to be employed by the first playback device for communication over the wireless mesh network;
after connecting to the wireless mesh network, determining a geographic region in which the first playback device is located from a plurality of geographic regions, wherein determining the geographic region in which the first playback device is located comprises determining a country in which the first playback device is located, wherein each of the plurality of geographic regions has respective regulatory requirements for wireless communication, and wherein at least some of the plurality of geographic regions have respective regulatory requirements for wireless communication that are different;
receiving, from a cloud-based server via the wireless mesh network, an instruction to update network parameters based on the determined geographic region and the respective regulatory requirements for the determined geographic region, the instruction comprising (i) an instruction from the cloud-based server to set a channel for operation on the wireless mesh network, (ii) an instruction from the cloud-based server to set a transmit power for operation on the wireless mesh network, and (iii) an instruction from the cloud-based server to set a bit rate for operation on the wireless mesh network;

based on the instruction to update network parameters received from the cloud-based server, updating the network settings to be employed by the first playback device for communication over the wireless mesh network; and after updating the network settings to be employed by the first playback device for communication over the wireless mesh network, (i) receive, based on the updated network settings, audio content over the wireless mesh network via the spanning tree protocol and (ii) play audio associated with the received audio content in synchrony with a second playback device of the plurality of playback devices.

8. The first playback device of claim 7, wherein the instruction from the cloud-based server to set the channel for operation on the wireless mesh network comprises an instruction from the cloud-based server to initiate the channel change on the wireless mesh network.

9. The first playback device of claim 7, wherein the instruction from the cloud-based server to set the transmit power for operation on the wireless mesh network comprises an instruction from the cloud-based server to adjust the transmit power on the wireless mesh network.

10. The first playback device of claim 7, wherein the instruction from the cloud-based server to set the bit rate for operation on the wireless mesh network comprises an instruction from the server to adjust the bit rate on the wireless mesh network.

11. The first playback device of claim 7, wherein the geographic region in which the first playback device is located is determined based on a global positioning device.

12. The first playback device of claim 7, wherein the determining the geographic region in which the first playback device is located is triggered by the connection to the wireless mesh network by the first playback device.

13. A non-transitory computer-readable medium, wherein the non-transitory computer-readable medium is provisioned with program instructions that are executable by one or more processors such that a first playback device is configured to:
connect to a wireless mesh network on which a plurality of playback devices operate, wherein the wireless mesh network is configured according to a spanning tree associated with a spanning tree protocol, and wherein the first playback device comprises network settings to be employed by the first playback device for communication over the wireless mesh network;
after connecting to the wireless mesh network, determining a geographic region in which the first playback device is located from a plurality of geographic regions, wherein determining the geographic region in which the first playback device is located comprises determining a country in which the first playback device is located, wherein each of the plurality of geographic regions has respective regulatory requirements for wireless communication, and wherein at least some of the plurality of geographic regions have respective regulatory requirements for wireless communication that are different;

receiving, from a cloud-based server via the wireless mesh network, an instruction to update network parameters based on the determined geographic region and the respective regulatory requirements for the determined geographic region, the instruction comprising (i) an instruction from the cloud-based server to set a channel for operation on the wireless mesh network, (ii) an instruction from the cloud-based server to set a transmit power for operation on the wireless mesh network, and (iii) an instruction from the cloud-based server to set a bit rate for operation on the wireless mesh network;

based on the instruction to update network parameters received from the cloud-based server, updating the network settings to be employed by the first playback device for communication over the wireless mesh network; and after updating the network settings to be employed by the first playback device for communication over the wireless mesh network, (i) receive, based on the updated network settings, audio content over the wireless mesh network via the spanning tree protocol and (ii) play audio associated with the received audio content in synchrony with a second playback device of the plurality of playback devices.

14. The non-transitory computer-readable medium of claim 13, wherein the instruction from the cloud-based server to set the channel for operation on the wireless mesh network comprises an instruction from the cloud-based server to initiate the channel change on the wireless mesh network.

15. The non-transitory computer-readable medium of claim 13, wherein the instruction from the cloud-based server to set the transmit power for operation on the wireless mesh network comprises an instruction from the cloud-based server to adjust the transmit power on the wireless mesh network.

16. The non-transitory computer-readable medium of claim 13, wherein the instruction from the cloud-based server to set the bit rate for operation on the wireless mesh network comprises an instruction from the cloud-based server to adjust the bit rate on the wireless mesh network.

17. The non-transitory computer-readable medium of claim 13, wherein the geographic region in which the first playback device is located is determined based on a global positioning device.

* * * * *